Patented Feb. 27, 1934

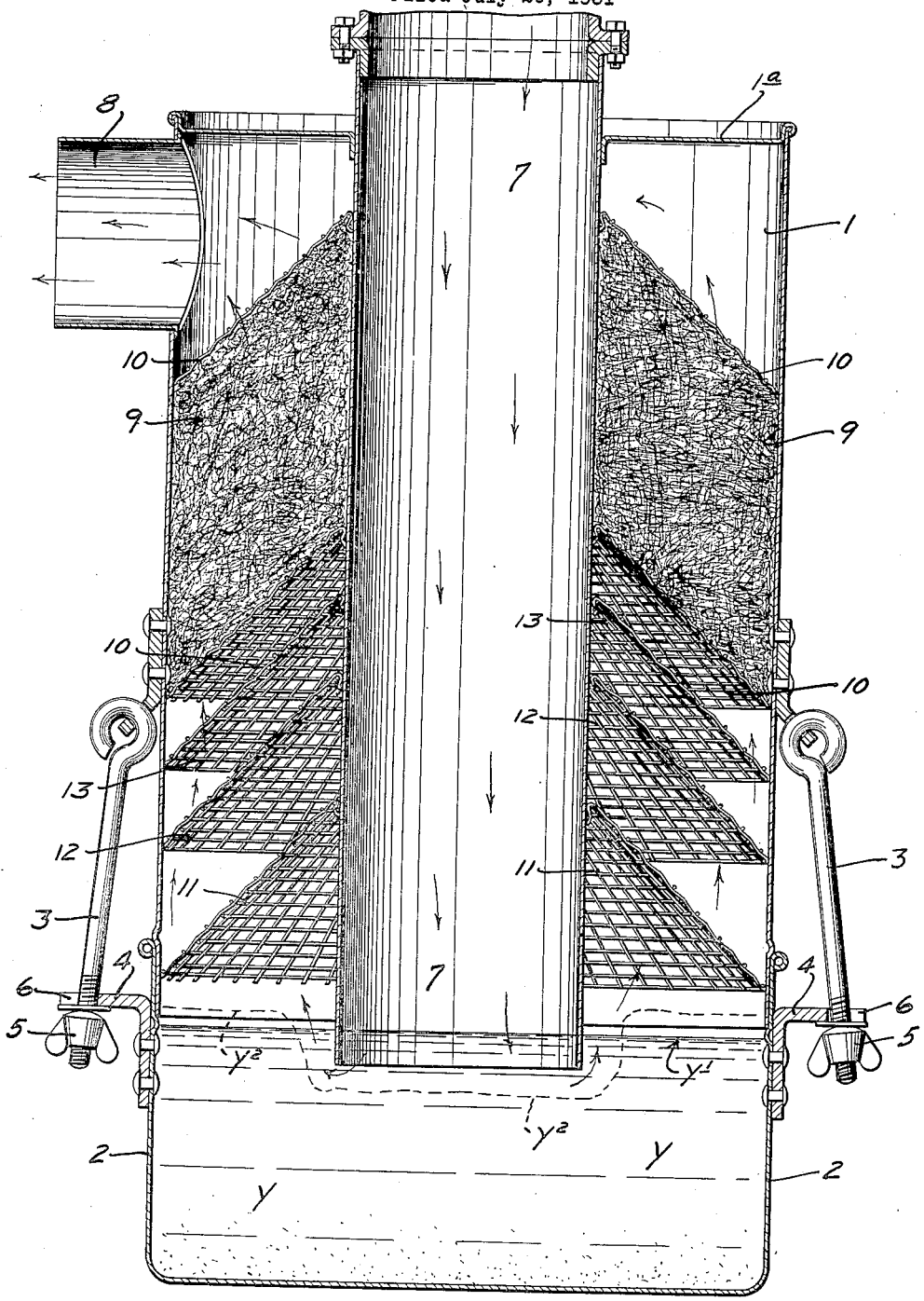

1,949,212

UNITED STATES PATENT OFFICE 1,949,212

AIR CLEANER

Wilfred W. Lowther, Minneapolis, Minn., assignor to Donaldson Company, Inc., St. Paul, Minn., a corporation of Minnesota Application July 20, 1931. Serial No. 551,883

1 Claim. (Cl. 183—10)

My invention relates to air cleaners that are capable of very general use but are especially adapted for use in connection with internal combustion engines such, for example, as those employed in or in connection with tractors, harvesting machines, automobiles, stationary machinery and the like. Generally stated, the invention consists of the novel devices, combinations of devices and arrangement of parts hereinafter described and defined in the claim. The invention is illustrated in the single view of drawing and which view is a vertical axial section taken through the improved air cleaner.

As preferably designed, the casing or shell of the air cleaner is a vertically disposed sheet metal cylinder 1, under the lower end of which is telescoped a detachable oil well 2. For detachably holding the shell, the latter as shown, is provided with depending hinged clamping bolts 3 and the well, as shown, is provided with outstanding lugs 4. The clamping bolts are provided with nuts 5 and the lugs 4 are formed with open notches 6 that permit the bolts to be engaged with the lugs by swinging movement and with the nuts 5 below said lugs.

The shell 1 is provided at its upper end with an annular head 1ª through which is axially extended a quite large air intake tube or conduit 7, the lower end of which extends considerably down into the oil well 2. At or near its upper portion, the shell 1 is provided with a clean air outlet tube or conduit 8. In the upper portion of shell 1, but below the air outlet 8, is a filter that surrounds the air intake tube 7 and extends to the wall of the shell. This filter is preferably made up of a fibrous filler 9 of fibrous material such as moss held between reticulate screens 10, which as shown preferably are conical in form and are secured to the shell and frictionally engage the air intake tube.

Interposed in the air passage between the oil well and the above noted filter are dust-intercepting oil-spreading screens 11, 12 and 13 secured preferably to the walls of the shell and having frictional engagement with the air intake tube. These screens 11, 12 and 13 are inclined in the same direction and are spaced far apart to prevent oil globules accumulating on the one from directly contacting with another screen. The meshes of these screens, that is, the passages therethrough are of such small size that oil running over the same will spread and form films, and I have found that the best results can be obtained by spacing the screens progressively closer and closer together with an upright direction and to provide said screens with meshes or openings that decrease in size in the screens from the lower to the upper member; but this is a matter that will be more fully discussed in the description of the operation.

In this specification, I have used the term "screen" to include intercepting partitions having openings of such size that oil running over or down the same will spread and form oil films across or over the screen openings; and in practice, I have found that woven wire screens are most efficient. The inclination of the screens is also highly important as will hereinafter appear. Also in the specification, I have used the term "filter" to include the porous body of filtering material such as produced by moss, hair or other fibrous material pressed into a compact sort of felted arrangement that will absorb and hold a certain amount of oil and will intercept any dust attempting to pass with the air through the filter.

In actual practice, when the above described air cleaner is used as an air cleaner for an internal combustion engine of a tractor, the air intake tube or conduit 7 will be preferably extended to a considerable elevation out of the worst dust zone, and the clean air outlet 8 will be directed to the intake of the engine. The oil indicated at $y$ in the drawing and which will preferably be a quite heavy engine oil, should be kept in the oil well 2 approximately to the level $y^1$ which is somewhat above the lower end of the air intake tube 7.

Operation

When the air cleaner is connected to the internal combustion engine as above noted, and the engine is in action, suction produced from the engine through the air intake thereof will create a partial vacuum in the upper portion of the shell but above the filter, and of course, air under considerable velocity will be drawn into the air cleaner through the air intake pipe 7. This air striking the surface of the oil, that is normally within the lower end of the air intake tube 7, will depress the oil substantially to the extent indicated by the dotted line $y^2$ in the drawing and this will produce such violent agitation that the oil will be thrown into a bubble-forming foaming condition which, by the moving air, is converted into a spray that will be carried upward onto and through the screens 11, 12 and 13. The extent to which the oil will be carried onto and through said screens 11, 12 and 13 will depend, of course, to a very considerable extent, upon the speed at which the engine is running and hence the suction or partial vacuum produced through the intake, but in any event, it will be carried more or less upward and through the screens and some of the oil will be carried into the fibrous material of the filter, which acts to prevent oil from being carried over into the intake of the engine. Due to the incline of the bottom of the filter, oil runs off quite rapidly and is returned to the oil well. The filter is then continuously washed.

A large percentage of the dust taken into the intake tube 7, including substantially all of the heavier particles of dust, will be thrown directly into the main body of oil below the intake and thereby be separated from the air before it reverses its direction of travel and is directed toward the screens 11, 12 and 13.

Most of the remaining dust will be separated from the air by the dust-intercepting screens 11, 12 and 13, due to following important action, to wit: Oil delivered onto said screens will run downward on the wires or members thereof and will spread and form dust-intercepting oil films across and over the meshes or openings thereof. A large amount of the dust from the air will be precipitated directly into the oil of the oil well due to the wild agitation and commingling of the oil with the air, but such of the dust as is carried upward with the air must pass not only into contact with the oil-covered wires or members of the screens, but must pass through the oil films and will be intercepted and taken up with the oil and carried with the oil that runs under the action of gravity back into the oil well. There is, of course, a continuous breaking down of the oil films on the screens and hence the desirability of a plurality of such screens so that little or no dust-laden air will pass with the air to the filter. However, such small amount of dust as will, under some conditions, pass the screens will be intercepted by the filter so that substantially one hundred per cent pure air will be delivered to the engine intake.

I have found that inasmuch as the violence of the agitation and the amount of oil carried with the air decreases as the dust laden air passes to and through the screens 11, 12 and 13, that the best results will be obtained by progressively decreasing the distance between said screens in upwardly direction and in making the meshes or openings of the several screens progressively smaller in the screens from the lower toward the upper.

In practice, I have further found that the most efficient kind of an air cleaner can be made by a concentric arrangement of the elements substantially as shown in the drawing, but other arrangements have been also found very efficient. The screens, which are preferably conical, can be inclined either outwardly or inwardly but are preferably inclined in substantially the same direction so that they are in approximately parallel arrangement and brought into reasonably compact arrangement. The screens must not, however, be brought into such close contact that oil bubbles forming on the one screen can contact with another screen, and hence pass by capillary attraction from the one screen to the other.

With the apparatus illustrated and described and with various modifications thereof, I have made experiments which demonstrate that an efficient air cleaner employing oil as a collecting medium must involve the following features, to wit: the screens must be inclined and of such mesh that the oil will run down the same and spread and form oil films over the screen openings; there must be at least two screens arranged with clear or unobstructed air spaces between the same and on both sides of both screens and said screens must be spaced so that the oil will be carried in progressively decreasing amounts from a lower to an upper screen; there must be an oil containing well or sump immediately below the lower screen; and the air conduit through the cleaner must be arranged to direct the dust-laden air against the surface of the oil in the well or sump and from thence upward through the screens.

From the foregoing, it is evident that the device described is capable of a large range of modification all within the scope of the invention herein disclosed and desired to be broadly claimed.

What I claim is:

An air cleaner comprising a casing having an oil well, an air inlet and an air outlet, said inlet being arranged to direct the dust-laden air against the surface of the oil in said well, in combination with at least two inclined screens in said air passage immediately above the surface of the oil in said well, said screens having unobstructed air spaces between and on both sides of both thereof, said parts being so arranged that under forced passage of air through said cleaner, oil will be carried from said well onto said screens in decreasing quantities in an upward direction, and the oil caught by the screen will form films over the openings thereof and will run down the screens and back into said well, said screens being conical and inclined in a common direction, said screens being progressively closer and closer together in an upward direction.

WILFRED W. LOWTHER.